(12) United States Patent
Okada

(10) Patent No.: US 6,345,586 B1
(45) Date of Patent: Feb. 12, 2002

(54) METHOD FOR CONFIRMING VEHICLE TRAVEL POSITION AND EQUIPMENT FOR DISPLAYING VEHICLE TRAVEL POSITION

(75) Inventor: Yoshiji Okada, Hamamatsu (JP)

(73) Assignee: Mitsutoyo Industry Co., Ltd., Hamamatsu (JP)

( * ) Notice: Subject to any disclaimer, the term of this patent is extended or adjusted under 35 U.S.C. 154(b) by 0 days.

(21) Appl. No.: 09/344,367

(22) Filed: Jun. 25, 1999

(30) Foreign Application Priority Data

Jun. 30, 1998 (JP) .......................................... 10-199681

(51) Int. Cl.⁷ .............................................. B60Q 11/00
(52) U.S. Cl. ........................ 116/28 R; 33/264; 116/30; 116/201
(58) Field of Search .................... 116/28 R, 30, 116/31, 36, 50, 201, 321, 323, 324; 33/264, 286, 288

(56) References Cited

U.S. PATENT DOCUMENTS

| | | | | |
|---|---|---|---|---|
| 1,871,532 A | * | 8/1932 | Kenna | 33/264 |
| 2,681,633 A | * | 6/1954 | Basso | 116/28 R |
| 2,704,048 A | * | 3/1955 | Perier | 116/308 |
| 3,199,487 A | * | 8/1965 | Heinkel | 116/28 R |
| 3,834,036 A | * | 9/1974 | Scarritt, Sr. | 33/264 |
| 3,900,831 A | * | 8/1975 | Houseman et al. | 340/459 |
| 4,079,519 A | * | 3/1978 | Carmouche | 33/264 |
| 4,607,444 A | * | 8/1986 | Foster | 40/550 |
| 4,677,753 A | * | 7/1987 | Loggers | 33/264 |
| 4,823,471 A | * | 4/1989 | Schaack | 33/264 |
| 4,860,684 A | * | 8/1989 | Al-Harbi | 116/308 |
| 5,048,452 A | * | 9/1991 | Haddock et al. | 116/225 |
| 5,609,121 A | * | 3/1997 | Gross | 116/28 R |
| 5,796,331 A | * | 8/1998 | Lamparter | 340/433 |

* cited by examiner

Primary Examiner—Kien T. Nguyen
Assistant Examiner—Faye Francis
(74) Attorney, Agent, or Firm—Varndell & Varndell, PLLC

(57) ABSTRACT

The present invention provides a vehicle travel position marker and method for confirming vehicle travel position for correct, visual confirmation of tire position and vehicle width, which before now could only be sensed. The present invention relates to a method for confirming vehicle travel position wherein markers 2a and 2b are established at positions, at or near the inside bottom of the vehicle A windshield 1, appearing from the driver's seat to lie over lines extending from the right and left tires 3a and 3b of the vehicle A, and the vehicle is operated using the markers 2a and 2b as signs for the positions through which the right and left tires 3a and 3b will pass. The present invention also relates to vehicle travel position markers used in the method for confirming vehicle travel position.

6 Claims, 6 Drawing Sheets

F I G. 4
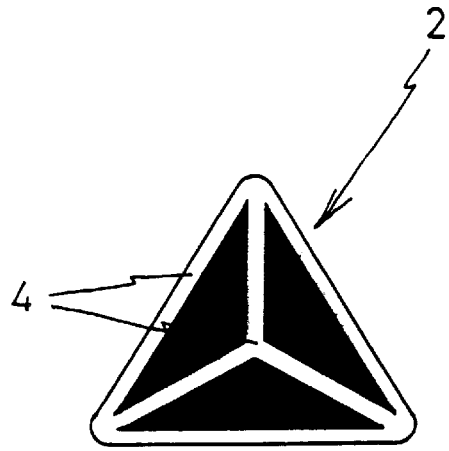
F I G. 5
(a)
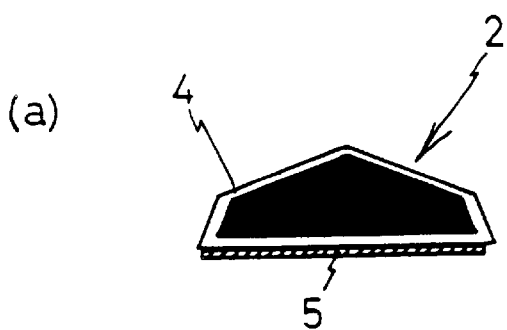
(b)
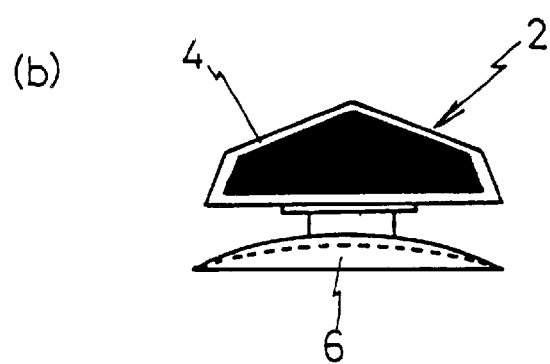

METHOD FOR CONFIRMING VEHICLE TRAVEL POSITION AND EQUIPMENT FOR DISPLAYING VEHICLE TRAVEL POSITION

BACKGROUND OF THE INVENTION

1. Field of the Invention

The present invention relates to a method for confirming vehicle travel position and vehicle travel position markers, to allow beginning drivers who do not yet have a correct sense of their vehicles, or persons driving a newly purchased vehicle, to judge the correct position on the road of the vehicles they are driving.

2. Description of the Related Art

When driving a vehicle, especially when driving a vehicle on narrow streets, a driver must drive while estimating the positions through which the tires pass, as well as the width of the vehicle.

Usually, a driver can unconsciously use part of the vehicle, such as a protrusion on the hood to grasp to some degree the tire position and vehicle width and guide the vehicle through the desired course on the road.

Because the sense of the vehicle attained in this way is ambiguous, the perceived position of the vehicle on the road and the actual position may not match. In extreme cases, the driver may drive the vehicle outside of the center or boundary lines on the road. It is not only new drivers who, when passing vehicles on narrow roads, cannot correctly determine how close to bring their vehicles to the shoulder or ditch and then allow the tires to go into the ditch or drive the car on the shoulder.

The present invention was made in view of the foregoing situation of vehicle operation. It is an object of the present invention to provide a method for confirming the vehicle travel position and markers for indicating vehicle travel position, allowing correct, visual confirmation of the tire position or vehicle width which before now could only be sensed.

SUMMARY OF THE INVENTION

In order to achieve the abovementioned object, the present invention is a method for confirming vehicle travel position and vehicle travel position markers used in this method for confirming vehicle travel position, wherein the markers are established at the inside bottom of the vehicle windshield or in the vicinity thereof in positions, when seen from the driver's seat, so as to appear to lie over lines extending from the tires on both sides of the vehicle; the driver operates the vehicle using with these markers to indicate the location of the tires on both sides.

The abovementioned invention makes it possible to confirm tire location or vehicle width using markers established at the inside bottom of the vehicle windshield or in the vicinity thereof; before now, such confirmation could only be attained through intuition or experience because such markers were not used. A driver can therefore easily and correctly guide the vehicle through the desired course on the road.

Moreover, the markers used in the method for confirming vehicle travel position relating to the present invention are preferably markers having an adhesive layer or suction cup on the back or bottom surface. The marker preferably has a lower surface allowing the marker to be moved crosswise to the vehicle on the upper surface of the vehicle dashboard and anchored in the desired position.

The markers can therefore easily be positioned, and that position can easily be adjusted, so that the markers are established at the inside bottom of the vehicle windshield or in the vicinity thereof in positions, when seen from the driver's seat, so as to appear to lie on lines extending from the tires on both sides of the vehicle.

The vehicle travel position markers relating to the present invention preferably have a fluorescent body established on at least part of the front surface or top. This is so that the marker can function even during night driving or the like.

BRIEF DESCRIPTION OF THE DRAWINGS

FIG. 4 is a front view showing an example of the vehicle travel position marker relating to the present invention;

FIG. 5 is a side view of the vehicle travel position marker relating to the present invention; (a) is a side view of the marker with an adhesive layer on the back surface and (b) is a side view of the marker with a suction cup on the back surface;

DESCRIPTION OF THE PREFERRED EMBODIMENTS

The preferred embodiments of the present invention are explained below with reference to the figures.

Figure 1:
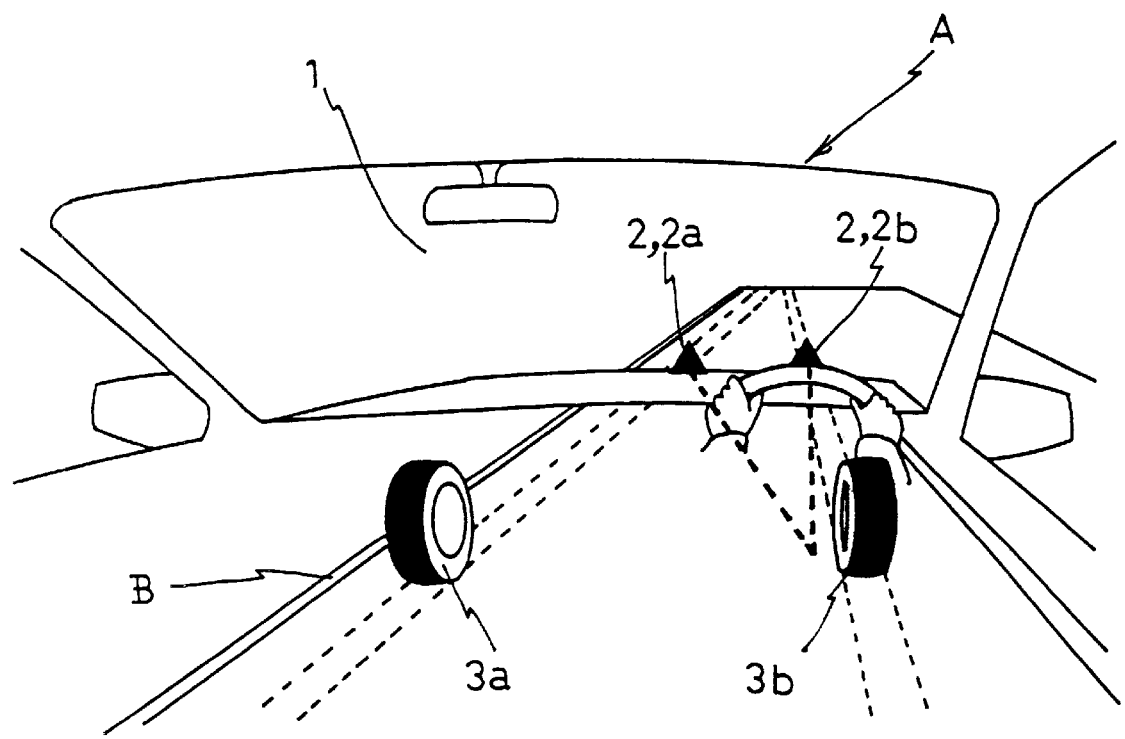
FIG. 1 is a diagram showing the method for confirming vehicle travel position relating to the present invention.

FIG. 1 shows the method for confirming vehicle travel position relating to the present invention. In this FIG. 1 shows the windshield and 2 shows the markers established at the inside bottom of the windshield 1.

These markers 2 comprise a left marker 2a showing the position through which the left tire 3a of the vehicle passes and a right marker 2b showing the position through which the right tire 3b passes.

The abovementioned markers 2a and 2b are established in the prescribed positions on the windshield 1 with the following method.

Figure 2:
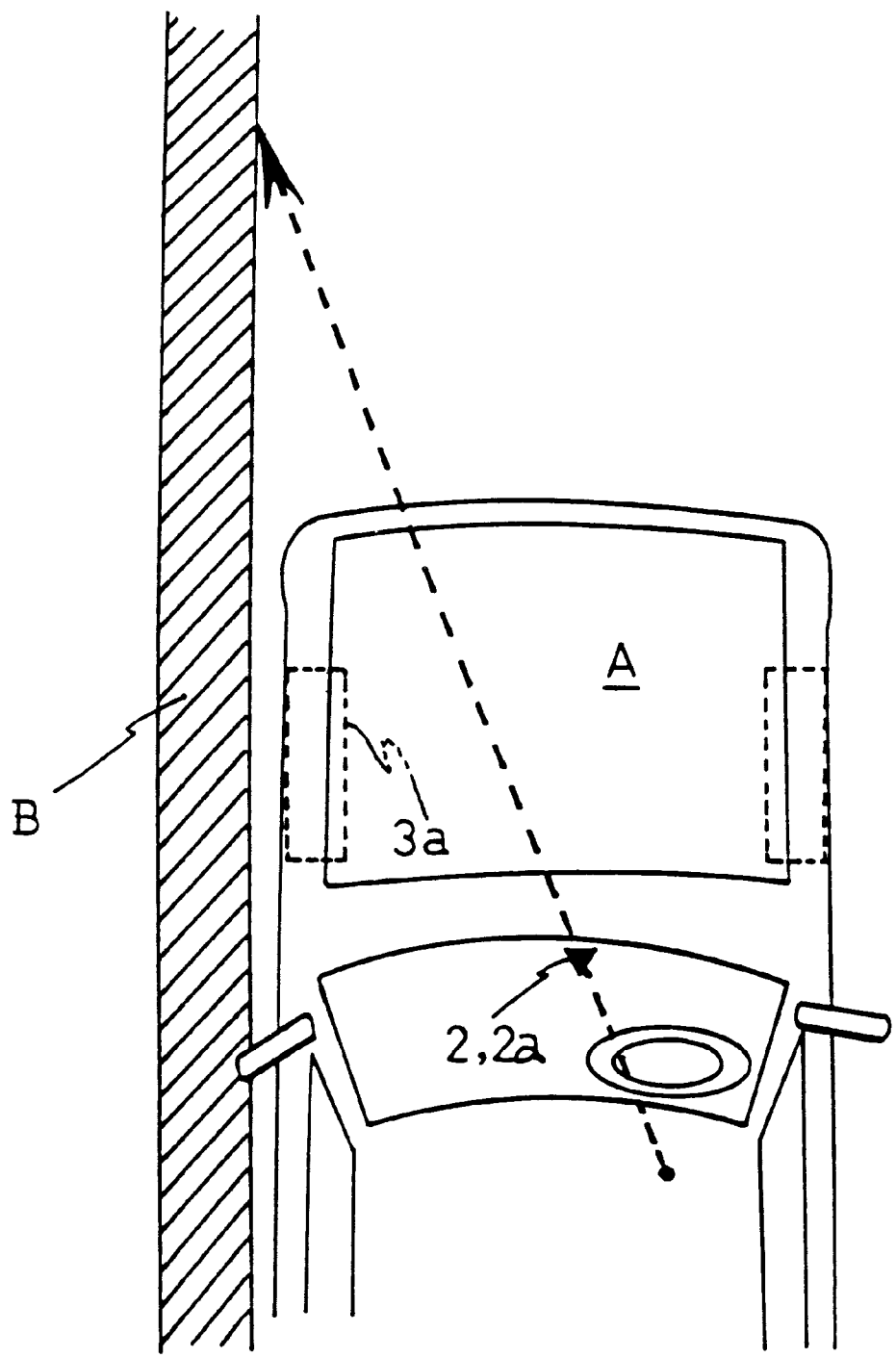
FIG. 2 is a diagram showing a method for establishing the vehicle travel position markers relating to the present invention.

As shown in FIG. 2, the vehicle A is halted at a position where it is exactly along the inside of the side ditch or white line B to the left. Next, the left side marker 2a is affixed at the position on the windshield 1 such that the marker 2a appears to lie over the side ditch or white line B, as seen from the driver's seat of this vehicle A, as shown by the dotted lines in FIG. 2.

Figure 3:
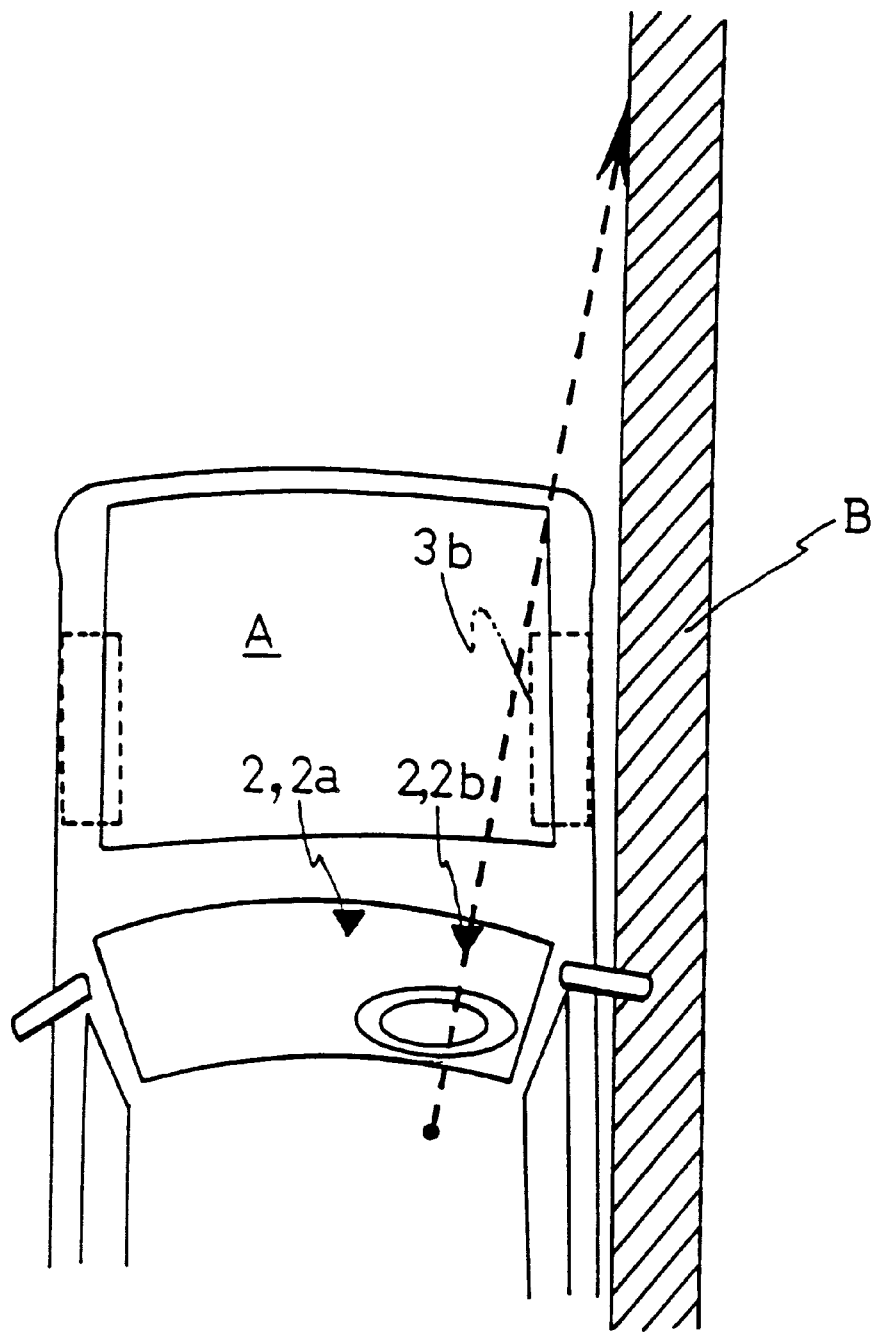
FIG. 3 is a diagram showing a method for establishing the vehicle travel position markers relating to the present invention.

Then the vehicle A is moved and then halted at a position where it is exactly along the inside of the side ditch or white line B to the right, as shown in FIG. 3. As above, the right side marker 2b is affixed at the position on the windshield 1 such that the marker 2b appears to lie over the side ditch or white line B, as seen from the driver's seat of this vehicle A.

In this way, the markers 2a and 2b are positioned on the inside bottom of the windshield 1 in successive operations.

As shown in FIG. 1, the left marker 2a serves to show the lines extending from the left tires 3a, specifically the position on the road through which the left tires 3a will pass. As shown in FIG. 1, the right marker 2b serves to show the lines extending from the right tires 3b, specifically the position on the road through which the right tires 3b will pass.

If driving a vehicle and using these markers 2a, 2b as signs, the driver can thereby confirm the position through which the vehicle tires will pass and vehicle width. The driver can then easily and correctly guide the vehicle through the desired course on the road.

The pyramidal markers shown in FIG. 4, for example, can be used as the markers 2 in the abovementioned method for confirming vehicle travel position relating to the present invention.

This marker 2 is small, no more than several centimeters on a side. This is so that the marker 2 does not block the driver's field of view when the markers are positioned at the inside bottom of the windshield 1.

A fluorescent body 4, as shown by the white portions in FIG. 4, is established on the surface of the marker 2. This is so that the marker 2 can be used as a sign even at night.

Furthermore, an adhesive layer 5 as shown in FIG. 5(a) or a suction cup 6 as shown in FIG. 5(b) is established on the back surface of the marker 2. This is so that the marker 2 can be easily established at the prescribed position on the inside bottom of the windshield 1 and the position can be easily corrected.

Figure 6:
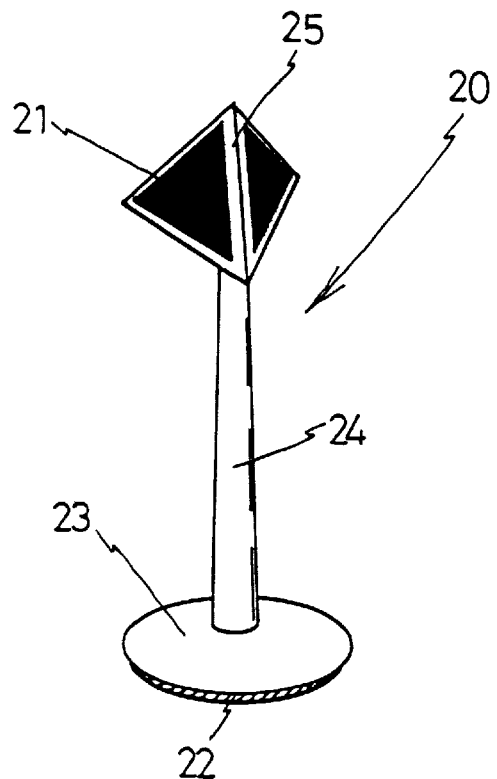
FIG. 6 is a perspective view showing another example of the vehicle travel position marker relating to the present invention.
Figure 7:
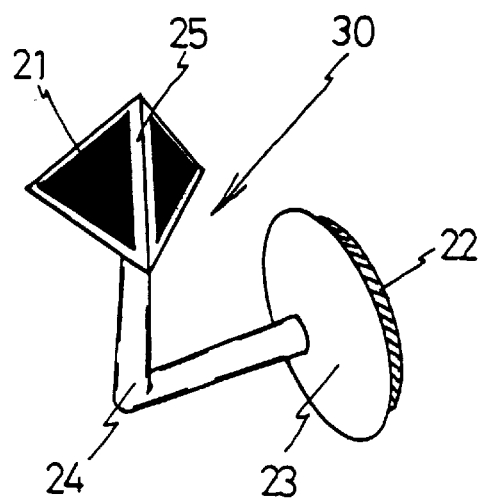
FIG. 7 is a perspective view showing another example of the vehicle travel position marker relating to the present Invention.
Figure 8:
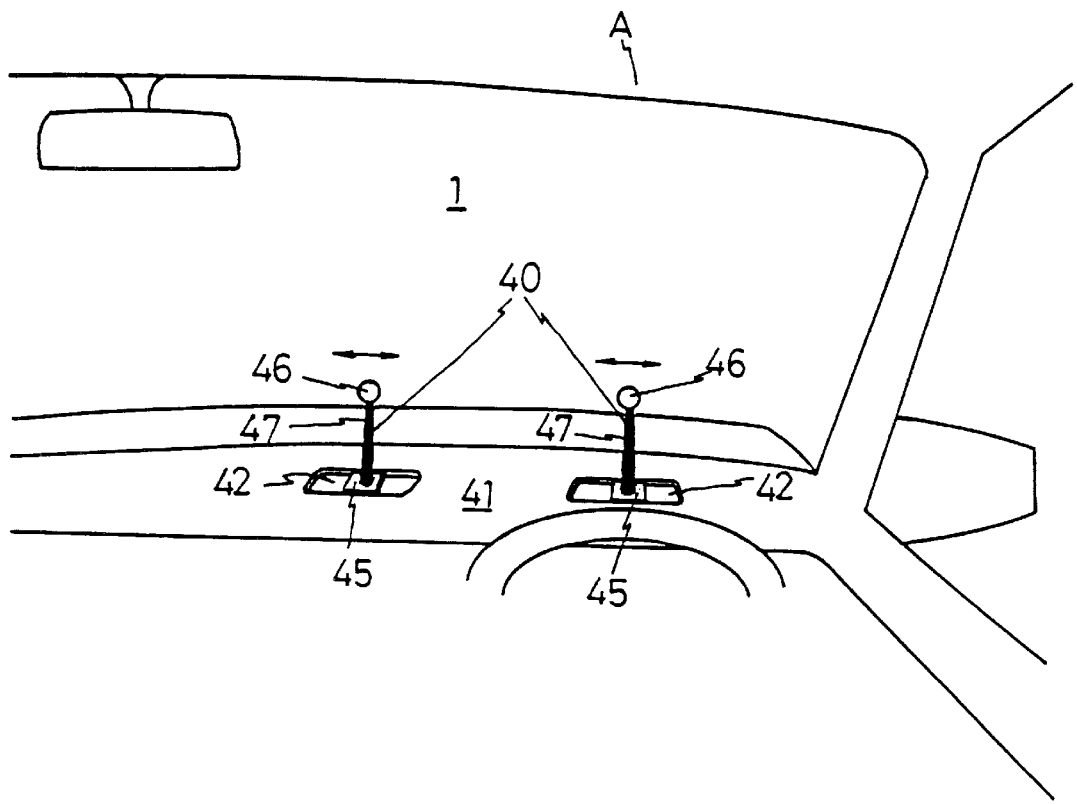
FIG. 8 is a perspective view showing another example of the vehicle travel position marker relating to the present invention.

The markers with the structures shown in FIGS. 6, 7, and 8 can be used as the marker 2 in the method for confirming vehicle travel position relating to the present invention.

The marker 20 shown in FIG. 6 is the type to be established on the upper'surface of the dashboard near the bottom inside of the windshield 1. This marker 20 has a structure widened at the top with a sign portion 21, a setting portion 23 with an adhesive layer 22 on the bottom, and a rigid post 24 located therebetween.

Like the abovementioned marker 2, this marker 20 is set at a prescribed position on the upper'surface of the dashboard so that the sign portion 21 of this marker 20 is used as a sign to show the position through which the tires will pass.

Moreover, a fluorescent body 25, as shown by the white portions in FIG. 6, is established on the sign portion 21 of this marker 20. The setting portion 23 of this marker 20 may have a structure whereby it can be installed with a suction cup like the abovementioned marker 2, although this is not shown in the figure.

The marker 30 shown in FIG. 7 has a structure wherein the post 24 in the abovementioned marker 20 is bent and the marker is affixed to the inside bottom of the windshield 1 using an adhesive layer 22 on the setting portion 23.

This marker 30 uses the sign portion 21, which is located at a position apart from the windshield 1, as the sign for the position through which the tires pass, like the abovementioned marker 2.

Moreover, a fluorescent body 25 is established on at least part of the sign portion 21 of this marker 30, like on the marker 20. Also, the setting portion 23 of this marker 20 sic is not shown, but may also be a suction cup.

Furthermore, the markers 40 shown in FIG. 8 have a structure such that the bottom of the marker 40 can be moved crosswise to the vehicle on the upper'surface of the vehicle dashboard 41 and can be anchored at the desired position, as shown in the figure.

Figure 9:
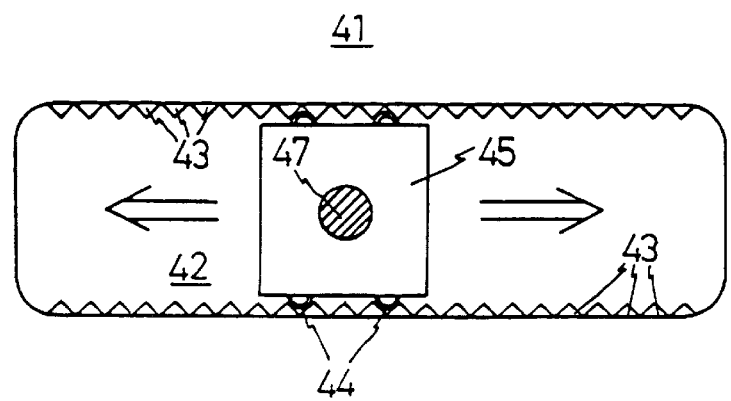
FIG. 9 is a diagram showing a detail from the marker in FIG. 8.

The markers 40 have the following structure: shallow depressions 42 are formed in the upper'surface of the vehicle dashboard 41; teeth 43 are formed at equal intervals on both of the lengthwise side walls of these depressions 42, as shown in FIG. 9; a mechanism to engage with these teeth 43, such as a slider 45 whereon is established a circular spring 44 with one end free, is installed; and a rigid post 47, widened at the top by a sign portion 46 formed thereon, is established on this slider 45.

In the case of using markers 40 with this structure, like the case of the abovementioned markers 2, the sliders 45 are moved to a position such that the sign portion 46 lies over the lines extending from the right and left vehicle tires. The slider 45 is anchored at that position using the engagement mechanism (circular spring) 44 and the sign portion 46 is established near the inside bottom of the windshield 1. During vehicle operations, these sign portions 46 are used to show the position through which the tires will pass.

The preferred embodiments of the present invention were explained above, but the present invention is not limited to these embodiments. Various changes and modifications are possible within the technical scope of the present invention, specifically: a method for confirming vehicle travel position with markers established on or near the inside bottom of the vehicle windshield at positions appearing to lie over lines extending from right and left vehicle tires as seen from the driver's seat, wherein these markers are used as signs of the positions through which the right and left tires will pass; and markers for showing vehicle travel position used in the method for confirming vehicle travel position.

For example, the abovementioned embodiments show only one example of the method for establishing markers; it is also possible to mark lines extending from the vehicle tires on the road with chalk and establish the markers at positions which appear to lie over these chalk lines.

Also, only one example of the form of the markers was shown in the abovementioned embodiments; it is also possible that the markers established on the inside bottom of the windshield of in the vicinity thereof be in the form of characters or the like, so long as the markers are of a size which does not obstruct the driver's field of view.

The present invention explained above has the effect of making it possible to correctly and easily guide a vehicle through the desired course on the road and to prevent accidents such as contact or wheels dropping off the road, because the vehicle width or position through which the tires will pass can be confirmed with markers established at the inside bottom of the windshield or in the vicinity thereof; before now this could only be known through experience or intuition.

What is claimed is:

1. A method for confirming vehicle travel position comprising the steps of:

securing markers within a cab of the vehicle on a dashboard of the vehicle, the markers being movably attached to the vehicle through a shallow depression, a plurality of teeth arranged at sides of the shallow depression, and a slider for engaging the plurality of teeth, the markers having a viewing surface with a fluorescent material facing a driver's seat of the vehicle;

positioning the markers, so that the fluorescent material of the markers respectively lie over a line extending from right and left tires of the vehicle as viewed from the driver's seat of the vehicle, by sliding the slider along the shallow depression so that the slider respective engages different teeth of the plurality of teeth; and operating the vehicle using the fluorescent material of the markers to position the vehicle through which the right and left tires will pass.

2. The method for confirming vehicle travel position according to claim 1, wherein the viewing surfaces of the markers respectively are a flat surface, the flat surface has a triangular shape, the fluorescent material is arranged in a pattern of straight lines about edges of the triangular shape, the markers are arranged so that the viewing surfaces of the markers face the driver's seat of the vehicle, and the pattern of fluorescent material is used for conforming vehicle travel position at night.

3. The method for confirming vehicle travel position according to claim 1, wherein the viewing surfaces of the markers include flat surfaces, the flat surfaces have a pyramidal shape, the fluorescent material is arranged in pattern of straight lines about edges of the pyramidal shape, the markers are arranged so that the viewing surfaces of the markers face the driver's seat of the vehicle, and the pattern of fluorescent material is used for conforming vehicle travel position at night.

4. The method for confirming vehicle travel position according to claim 1, wherein the viewing surfaces of the markers respectively are a flat surface, the flat surface has a pentagonal shape, the fluorescent material is arranged in a pattern of straight lines about edges of the pentagonal shape, and the pattern of fluorescent material is used for conforming vehicle travel position at night.

5. The method for confirming vehicle travel position according to claim 1, wherein the viewing surfaces of the markers includes two flat triangular pieces joined together a common edge thereof, the two flat triangular pieces being oriented at an angle relative to each other, the fluorescent material is arranged in a pattern of straight lines about edges of the triangular pieces, the markers are arranged so that the viewing surfaces of the markers face the driver's seat of the vehicle, and the pattern of fluorescent material is used for conforming vehicle travel position at night.

6. The method for confirming vehicle travel position according to claim 1, wherein the viewing surfaces of the markers respectively are a flat surface, and the fluorescent material is arranged in a pattern of about edges of the flat surfaces of the viewing surfaces of the markers, the markers are arranged so that the viewing surfaces of the markers face the driver's seat of the vehicle, and the pattern of fluorescent material is used for conforming vehicle travel position at night.

* * * * *